United States Patent [19]
Nguyen et al.

[11] Patent Number: 6,028,144
[45] Date of Patent: Feb. 22, 2000

[54] COMPOSITION FOR THE CARCASS

[75] Inventors: Vi Thi Nguyen, Kildeer, Ill.; Patrick Anthony Grosso, Staten Island, N.Y.

[73] Assignee: Exxon Chemical Patents, Inc., Houston, Tex.

[21] Appl. No.: 08/000,946

[22] Filed: Jan. 5, 1993

Related U.S. Application Data

[63] Continuation-in-part of application No. 07/557,196, Jul. 24, 1990, abandoned.

[51] Int. Cl.$^7$ ............... C08L 15/02; B60C 9/02
[52] U.S. Cl. ............ 525/236; 525/235; 525/240; 525/242; 525/209; 525/214; 525/232; 524/515; 524/519; 524/525; 524/484; 152/209 R; 152/564
[58] Field of Search .................. 525/236, 235, 525/240, 242, 209, 214, 232; 524/515, 519, 525, 484; 152/209 R, 564

[56] References Cited

U.S. PATENT DOCUMENTS

| 3,658,639 | 4/1972 | Wirth | 525/237 |
|---|---|---|---|
| 4,467,060 | 8/1984 | Lee | 524/526 |

OTHER PUBLICATIONS

Rubber Grade Carbon Blacks by D.T. Norman p. 397–419 Vanderbilt Rubber Handbook, Thirteen Edition, Edited Robert F. Ohm, R.T. Vanderbilt Company, 1990.

Pneumatic Tire Compounding, W. H. Waddell, R. S. Bhakuni, W.W. Barbin, P.H. Sandstom, p. 597–609 Vanderbilt rubber Handbook, Thirteen Edition, Edition, Edited Robert F. Ohm, R.T Vanderbilt Company, 1990.

An Overview of Rolling Resistance, L.Y. Chang, J.S. Shackleton Elastomerics, 115, No. 3, Mar. 1983, p. 18–26.

Rubber Technology and Manufacture, Edited by C.M. Blow, C. Hepburn 2nd Edition, 1982, Butterworth p. 390–391.

Natural Rubber and the Synthetics, P.W. Allen, 1992, John Wiley, p. 208–211.

*Primary Examiner*—James J. Seidleck
*Assistant Examiner*—Olga Asinovsky
*Attorney, Agent, or Firm*—John E. Schneider; Myron B. Kurtzman; Joseph F. Reidy

[57] ABSTRACT

A composition, suitable for use in producing a tire carcass, is provided. The composition comprises a halogen-containing copolymer of a $C_4$ to $C_7$ isomonoolefin and a para-alkylstyrene; a rubber such as a blend of natural rubber and a copolymer of styrene and butadiene; carbon black, and a plasticizer oil. Tires comprising carcasses made of the composition are also provided.

25 Claims, 1 Drawing Sheet

COMPOSITION FOR THE CARCASS

This application is a C-I-P of Ser. No. 07/557,196 filed Jul. 24, 1990, now abandoned.

BACKGROUND OF THE INVENTION

1. Field of the Invention

The present invention relates to a composition suitable for use in tire carcass, particularly in automobile tire carcass.

2. Description of Information Disclosures

The use of various rubber blends in compositions suitable for use in producing carcasses for tires, such as automobile tires, is known. See, for example, U.S. Pat. No. 4,790,365.

There is still a need to improve the performance of tire carcasses, for example, adhesion to elastomers used in liners, e.g., chloro-isobutene-isoprene; reduction in air permeability, and increase in heat aging resistance (i.e., elongation retention).

It has now been found that a tire carcass that is made from a composition comprising certain halogen-containing copolymers of a $C_4$ to $C_7$ isomonoolefin and a para-alkylstyrene have improved properties.

SUMMARY OF THE INVENTION

In accordance with the invention, there is provided a tire carcass composition comprising:

(a) A halogen-containing copolymer of a $C_4$ to $C_7$ isomonoolefin and a para-alkylstyrene;

(b) A rubber selected from the group consisting of natural rubber, styrene-butadiene polymer, and mixtures thereof;

(c) carbon black;

(d) a plasticizer oil, and (e) a curing agent.

In accordance with the invention there is also provided a vulcanized tire comprising a carcass, at least a portion of said carcass being made of a composition comprising the above stated composition.

BRIEF DESCRIPTION OF THE DRAWING

The sole FIGURE is a graph in which is plotted air permeability versus content of a brominated isobutylene-para-methylstyrene copolymer.

DETAILED DESCRIPTION OF THE INVENTION

Figure 1:
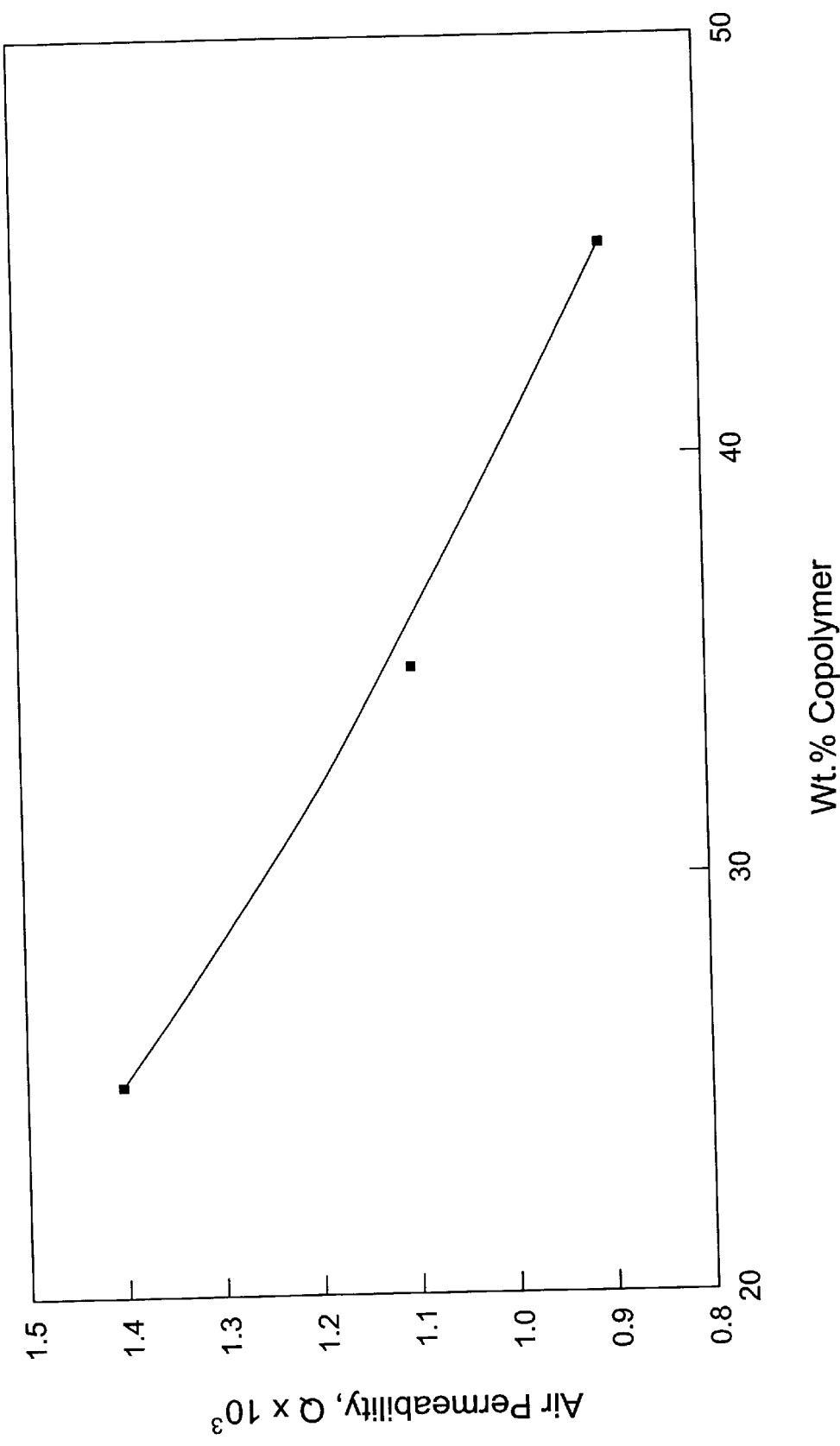

The tire carcass composition of the present invention comprises a halogen-containing copolymer of a $C_4$ to $C_7$ isomonoolefin and a para-alkylstyrene, a specified rubber other than said halogen-containing copolymer, carbon black, a plasticizer oil and a curing agent with or without curing agent accelerators. Optionally, the composition may comprise fillers other than the carbon black and rubber compounding additives.

Suitable halogen-containing copolymers of a $C_4$ to $C_7$ isomonoolefin and a para-alkylstyrene for use as a component of the present tire carcass composition comprise at least 0.5 weight percent of the para-alkylstyrene moiety. For elastomeric copolymer products, the para-alkylstyrene moiety may range from about 0.5 weight percent to about 20 weight percent, preferably from about 1 to about 20 weight percent, more preferably from about 2 to about 20 weight percent of the copolymer. The halogen content of the copolymers may range from above zero to about 7.5 weight percent. The halogen may be bromine, chlorine, and mixtures thereof. Preferably, the halogen is bromine. The major portion of the halogen is chemically bound to the para-alkyl group, that is, the halogen-containing copolymer comprises para-halo alkyl groups.

The copolymers of the isomonoolefin and para-alkylstyrene useful to prepare the halogen-containing copolymers suitable as component of the tire carcass composition of the present invention include copolymers of isomonoolefin having from 4 to 7 carbon atoms and a para-alkylstyrene, such as those described in European patent application 89305395.9 filed May 26, 1989, (Publication No. 0344021 published Nov. 29, 1989). The preferred isomonoolefin comprises isobutylene. The preferred para-alkylstyrene comprises para-methylstyrene. Suitable copolymers of an isomonoolefin and a para-alkyl styrene include copolymers having a number average molecular weight ($\overline{M}_n$) of at least about 25,000, preferably at least about 30,000, more preferably at least about 100,000. The copolymers also, preferably, have a ratio of weight average molecular weight ($\overline{M}_w$) to number average molecular weight ($\overline{M}_n$), i.e., $\overline{M}_w/\overline{M}_n$ of less than about 6, preferably less than about 4, more preferably less than about 2.5, most preferably less than about 2. The brominated copolymer of the isoolefin and para-alkylstyrene by the polymerization of these particular monomers under certain specific polymerization conditions now permit one to produce copolymers which comprise the direct reaction product (that is, in their as-polymerized form), and which have unexpectedly homogeneous uniform compositional distributions. Thus, by utilizing the polymerization and bromination procedures set forth herein, the copolymers suitable for the practice of the present invention can be produced. These copolymers, as determined by gel permeation chromatography (GPC) demonstrate narrow molecular weight distributions and substantially homogeneous compositional distributions, or compositional uniformity over the entire range of compositions thereof. At least about 95 weight percent of the copolymer product has a para-alkylstyrene content within about 10 wt. percent, and preferably within about 7 wt. percent, of the average para-alkylstyrene content for the overall composition, and preferably at least about 97 wt. percent of the copolymer product has a para-alkylstyrene content within about 10 wt. percent and preferably within about 7 wt. percent, of the average para-alkylstyrene content for the overall composition. This substantially homogeneous compositional uniformity thus particularly relates to the intercompositional distribution. That is, with the specified copolymers, as between any selected molecular weight fraction the percentage of para-alkylstyrene therein, or the ratio of para-alkylstyrene to isoolefin, will be substantially the same, in the manner set forth above.

In addition, since the relative reactivity of para-alkylstyrene with isoolefin such as isobutylene is close to one, the intercompositional distribution of these copolymers will also be substantially homogeneous. That is, these copolymers are essentially random copolymers, and in any particular polymer chain the para-alkylstyrene and isoolefin units will be essentially randomly distributed throughout that chain.

The halogen-containing copolymers useful in the practice of the present invention have a substantially homogeneous compositional distribution and include the para-alkylstyrene moiety represented by the formula:

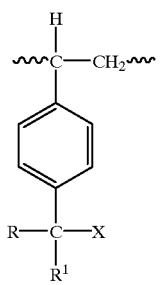

in which R and $R^1$ are independently selected from the group consisting of hydrogen, alkyl preferably having from 1 to 5 carbon atoms, primary alkyl halides, secondary halides preferably having from 1 to 5 carbon atoms, mixtures thereof and X is selected from the group consisting of bromine, chlorine and mixtures thereof, such as those disclosed in European patent application 8930595.9 filed May 26, 1989, (Publication No. 0344021 published Nov. 29, 1989).

Various methods may be used to produce the copolymers of isomonoolefin and para-alkylstyrene, as described in said European publication. Preferably, the polymerization is carried out continuously in a typical continuous polymerization process using a baffled tank-type reactor fitted with an efficient agitation means, such as a turbo mixer or propeller, and draft tube, external cooling jacket and internal cooling coils or other means of removing the heat of polymerization, inlet pipes for monomers, catalysts and diluents, temperature sensing means and an effluent overflow to a holding drum or quench tank. The reactor is purged of air and moisture and charged with dry, purified solvent or a mixture of solvent prior to introducing monomers and catalysts.

Reactors which are typically used in butyl rubber polymerization are generally suitable for use in a polymerization reaction to produce the desired para-alkylstyrene copolymers suitable for use in the process of the present invention. The polymerization temperature may range from about minus 35° C. to about minus 100° C., preferably from about minus 40 to about minus 80° C.

The processes for producing the copolymers can be carried out in the form of a slurry of polymer formed in the diluents employed, or as a homogeneous solution process. The use of a slurry process is, however, preferred, since in that case, lower viscosity mixtures are produced in the reactor and slurry concentration of up to 40 wt. percent of polymer are possible.

The copolymers of isomonoolefins and para-alkylstyrene may be produced by admixing the isomonoolefin and the para-alkylstyrene in a copolymerization reactor under copolymerization conditions in the presence of a diluent and a Lewis acid catalyst.

Typical examples of the diluents which may be used alone or in a mixture include propane, butane, pentane, cyclopentane, hexane, toluene, heptane, isooctane, etc., and various halohydrocarbon solvents which are particularly advantageous herein, including methylene, chloride, chloroform, carbon tetrachloride, methyl chloride, with methyl chloride being particularly preferred.

An important element in producing the copolymer is the exclusion of impurities from the polymerization reactor, namely, impurities which, if present, will result in complexing with the catalyst or copolymerization with the isomonoolefins or the para-alkylstyrene, which in turn will prevent one from producing the para-alkylstyrene copolymer product useful in the practice of the present invention. Most particularly, these impurities include the catalyst poisoning material, moisture and other copolymerizable monomers, such as, for example, metal-alkylstyrenes and the like. These impurities should be kept out of the system.

In producing the suitable copolymers, it is preferred that the para-alkylstyrene be at least 95.0 wt. percent pure, preferably 97.5 wt. percent pure, most preferably 99.5 wt. percent pure and that the isomonoolefin be at least 99.5 wt. percent pure, preferably at least 99.8 wt. percent pure and that the diluents employed be at least 99 wt. percent pure, and preferably at least 99.8 wt. percent pure.

The most preferred Lewis acid catalysts are ethyl aluminum dichloride and preferably mixtures of ethyl aluminum dichloride with diethyl aluminum chloride. The amount of such catalysts employed will depend on the desired molecular weight and the desired molecular weight distribution of the copolymer being produced, but will generally range from about 20 ppm to 1 wt. percent and preferably from about 0.001 to 0.2 wt. percent, based upon the total amount of monomer to be polymerized.

Halogenation of the polymer can be carried out in the bulk phase (e.g., melt phase) or either in solution or in a finely dispersed slurry. Bulk halogenation can be effected in an extruder, or other internal mixer, suitably modified to provide adequate mixing and for handling the halogen and corrosive by-products of the reaction. The details of such bulk halogenation processes are set forth in U.S. Pat. No. 4,548,995, which is hereby incorporated by reference.

Suitable solvents for solution halogenation include the low boiling hydrocarbons ($C_4$ to $C_7$) and halogenated hydrocarbons. Since the high boiling point para-methylstyrene makes its removal by conventional distillation impractical, and since it is difficult to completely avoid solvent halogenation, it is very important where solution or slurry halogenation is to be used that the diluent and halogenation conditions be chosen to avoid diluent halogenation, and that residual para-methylstyrene has been reduced to an acceptable level.

With halogenation of para-methylstyrene/isobutylene copolymers, it is possible to halogenate the ring carbons, but the products are rather inert and of little interest. However, it is possible to introduce halogen desired functionality into the para-methylstyrene/isobutylene copolymers hereof in high yields and under practical conditions without obtaining excessive polymer breakdown, cross-linking or other undesirable side reactions.

It should be noted that radical bromination of the enchained para-methyl styryl moiety in the useful copolymers for the practice of this invention can be made highly specific with almost exclusive substitution occurring on the para-methyl group, to yield the desired benzylic bromine functionality. The high specificity of the bromination reaction can thus be maintained over a broad range of reaction conditions, provided, however, that factors which would promote the ionic reaction route are avoided (i.e., polar diluents, Friedel-Crafts catalysts, etc.).

Thus, solutions of the suitable para-methylstyrene/isobutylene copolymers in hydrocarbon solvents such as pentane, hexane or heptane can be selectively brominated using light, heat, or selected radical initiators (according to conditions, i.e., a particular radical initiator must be selected which has an appropriate half-life for the particular temperature conditions being utilized, with generally longer half-lives preferred at warmer hydrogenation temperatures) as promoters of radical halogenation, to yield almost exclusively the desired benzylic bromine functionality, via substitution on the para-methyl group, and without appreciable chain scission and/or cross-linking.

This reaction can be initiated by formation of a bromine atom, either photochemically or thermally (with or without the use of sensitizers), or the radical initiator used can be one which preferentially reacts with a bromine molecule rather than one which reacts indiscriminately with bromine atoms, or with the solvent or polymer (i.e., via hydrogen abstraction). The sensitizers referred to are those photochemical sensitizers which will themselves absorb lower energy photons and disassociate, thus causing, in turn, disassociation of the bromine, including materials such as iodine. It is, thus, preferred to utilize an initiator which has a half life of between about 0.5 and 2500 minutes under the desired reaction conditions, more preferably about 10 to 300 minutes. The amount of initiator employed will usually vary between 0.02 and 1 percent by weight on the copolymer, preferably between about 0.02 and 0.3 percent. The preferred initiators are bis azo compounds, such as azo bis isobutyronitrile (AIBN), azo bis (2,4 dimethyl valero) nitrile, azo bis (2 methyl butyro) nitrile, and the like. Other radical initiators can also be used, but it is preferred to use a radical initiator which is relatively poor at hydrogen abstraction, so that it reacts preferentially with the bromine molecules to form bromine atoms rather than with the copolymer or solvent to form alkyl radicals. In those cases, there would then tend to be resultant copolymer molecular weight loss, and promotion of undesirable side reactions, such as cross-linking. The radical bromination reaction of the copolymers of para-methylstyrene and isobutylene is highly selective, and almost exclusively produces the desired benzylic bromine functionality. Indeed, the only major side reaction which appears to occur is disubstitution at the para-methyl group, to yield the dibromo derivative, but even this does not occur until more than about 60 percent of the enchained para-methylstyryl moieties have been monosubstituted. Hence, any desired amount of benzylic bromine functionality in the monobromo form can be introduced into the above stated copolymers, up to about 60 mole percent of the para-methylstyrene content.

It is desirable that the termination reactions be minimized during bromination, so that long, rapid radical chain reactions occur, and so that many benzylic bromines are introduced for each initiation, with a minimum of the side reactions resulting from termination. Hence, system purity is important, and steady-state radical concentrations must be kept low enough to avoid extensive recombination and possible cross-linking. The reaction must also be quenched once the bromine is consumed, so that continued radical production with resultant secondary reactions (in the absence of bromine) do not then occur. Quenching may be accomplished by cooling, turning off the light source, adding dilute caustic, the addition of a radical trap, or combinations thereof.

Since one mole of HBr is produced for each mole of bromine reacted with or substituted on the enchained para-methylstyryl moiety, it is also desirable to neutralize or otherwise remove this HBr during the reaction, or at least during polymer recovery in order to prevent it from becoming involved in or catalyzing undesirable side reactions. Such neutralization and removal can be accomplished with a post-reaction caustic wash, generally using a molar excess of caustic on the HBr. Alternatively, neutralization can be accomplished by having a particulate base (which is relatively non-reactive with bromine) such as calcium carbonate powder present in dispersed form during the bromination reaction to absorb the HBr as it is produced. Removal of the HBr can also be accomplished by stripping with an inert gas (e.g., $N_2$) preferably at elevated temperatures.

The brominated, quenched, and neutralized para-methylstyrene/isobutylene copolymers can be recovered and finished using conventional means with appropriate stabilizers being added to yield highly desirable and versatile functional saturated copolymers.

In summary, halogenation to produce a copolymer useful in the present invention is preferably accomplished by halogenating an isobutylene-para-methylstyrene copolymer using bromine in a normal alkane (e.g., hexane or heptane) solution utilizing a bis azo initiator, e.g., AIBN or VAZO® 52: 2,2'-azobis(2,4-dimethylpentane nitrile), at about 55 to 80° C., for a time period ranging from about 4.5 to about 30 minutes, followed by a caustic quench. The recovered polymer is washed in basic water wash and water/isopropanol washes, recovered, stabilized and dried.

In addition to the halogen-containing copolymer of a $C_4$ to $C_7$ isomonoolefin and a para-alkylstyrene, the tire carcass composition of the present invention also comprises a rubber component of certain rubbers, carbon black, a plasticizer oil, and a curing agent.

Suitable rubber components for the composition of the present invention in addition to the halogen-containing copolymer of the isomonoolefin and the para-alkylstyrene, are rubbers selected from the group consisting of natural rubber, a styrene-butadiene copolymer, and mixtures thereof.

The preferred rubber is a blend of natural rubber (NR) and a copolymer of styrene and butadiene (SBR). The NR to SBR weight ratio in such a blend may range from about 1:1 to about 5:1, preferably from about 1.5:1 to about 3:1.

Furthermore, the tire carcass composition may, optionally, comprise a component selected from the group consisting of a filler other than carbon black, a rubber compounding additive and mixtures thereof. The carbon black may be derived from any source. Suitable carbon black includes channel black, furnace black, thermal black, acetylene black, lamp black and the like.

Suitable plasticizer oils include hydrocarbon plasticizer oils such as paraffinic or naphthenic petroleum oils. The preferred plasticizer oil is a naphthenic petroleum oil. Suitable hydrocarbon plasticizer oils include oils having the following general characteristics:

| Property | Preferred | Minimum | Maximum |
| --- | --- | --- | --- |
| API° gravity at 60° F. | 15–30 | 10 | 35 |
| Flash Point, ° F. (open cup method) | 500–550 | 300 | 700 |
| Pour Point, ° F. | 15–30 | 10 | 60 |
| SSU at 100° F. | 100–12,000 | 50 | 20,000 |
| Iodine No. | 0–20 | 0 | 50 |

The filler and/or additive may be any conventional filler and/or additive generally used with rubber.

The optional other filler may be a non-reinforcing filler, a reinforcing filler, an organic filler, and an inorganic filler, and mixtures thereof.

Suitable fillers, other than carbon black, include calcium carbonate, clay, silica, talc, titanium dioxide and mixtures thereof. Suitable rubber compounding additives include antioxidants, stabilizers, non-plasticizer rubber processing oils, pigments and mixtures thereof. The non-plasticizer rubber process oils may be paraffinic or naphthenic process oils. Suitable antioxidants include hindered phenols, amino phenols, hydroquinones, alkyldiamines, amine condensation products and the like. The preferred additives are fatty acids, low molecular weight polyethylene, waxes and mixtures thereof. A preferred fatty acid is stearic acid. Mixtures of other fatty acids can be used with the stearic acid.

The tire carcass composition of the present invention also comprises a curing agent. Any known curative system suitable for vulcanization of rubber may be used.

Suitable curing agents include peroxide cures, sulfur cures, sulfur donor cures, and non-sulfur cures. For example, the curing agent may be zinc oxide. Optionally, curing agent accelerators may be used such as dithiocarbamates, thiurams, thioureas, and mixtures thereof. Zinc oxide-free cures may also be used such as, for example, litharge, 2-mercaptoimidazoline, and diphenyl guanidine; 2-mercaptobenzimidazole, and N,N'-phenylenebismaleimide. Organic peroxide may be used as curing agents, such as, for example, dicumyl peroxide, benzoyl peroxide, , '-Bis(tertiary butyl peroxy) diisopropyl benzene, and the like.

The tire carcass composition of the present invention may comprise the halogen-containing copolymer of a $C_4$ to $C_7$ isomonoolefin and a para-alkylstyrene in an amount ranging from about 5 to 70, preferably from about 10 to about 50 weight percent, the other rubber component(b) in an amount ranging from about 30 to about 95 weight percent, preferably from about 50 to about 90 weight percent, the carbon black in an amount ranging from about 20 to about 70, preferably from about 40 to about 60 weight percent; the plasticizer oil in an amount ranging from about 2 to about 20, preferably from about 5 to about 15 weight percent; the total amount of other fillers and additives in an amount ranging from about 2 to about 20, preferably from about 5 to about 15 weight percent; and the curing agent in an amount ranging from about 2 to 15, preferably from about 5 to 10 weight percent, all said percentages being based on the weight of the total elastomeric content, that is, based on the weight of the halogen-containing copolymer of a $C_4$ to $C_7$ isomonoolefin and a para-alkylstyrene plus the other rubber component.

The tire carcass composition of the present invention may be vulcanized by subjecting it to heat and or/light or radiation according to any conventional vulcanization process. Typically, the vulcanization is conducted at a temperature ranging from about 100° C. to about 250° C., preferably from about 150° C. to about 200° C., for a time period ranging from about 1 to about 150 minutes.

Suitable tire carcass compositions may be prepared by using conventional mixing techniques including, e.g., kneading, roller milling, extruder mixing, internal mixing (such as with a Banbury® mixer), etc. The sequence of mixing and temperatures employed are well known to the skilled rubber compounder, the objective being the dispersion of fillers, activators and curatives in the polymer matrix without excessive heat buildup. A useful mixing procedure utilizes a Banbury mixer in which the copolymer rubber, the other rubber component, carbon black and plasticizer are added and the composition mixed for the desired time or to a particular temperature to achieve adequate dispersion of the ingredients. Alternatively, the rubber and a portion of the carbon black (e.g., one-third to two-thirds) is mixed for a short time (e.g., about 1 to 3 minutes) followed by the remainder of the carbon black and oil. Mixing is continued for about 5 to 10 minutes at high rotor speed during which time the mixed compound reaches a temperature of about 140° C. Following cooling, the compound is mixed in a second step on a rubber mill during which the curing agent, e.g. zinc oxide and curing resin are thoroughly and uniformly dispersed at relatively low temperature, e.g., about 80 to about 105° C. Variations in mixing will be readily apparent to those skilled in the art. The present invention is not limited to any particular mixing procedure. The mixing is performed to disperse all components of the composition thoroughly and uniformly.

Vulcanization of a molded article, for example a tire carcass, may be carried out in heated presses under conditions well known to those skilled in the art.

It is preferred that vulcanization of the molded article be effected at temperatures of about 140 to about 185° C. and for periods of about 10 to about 60 minutes. Curing time will be affected by the thickness of the article to be molded and the concentration and type of curing agent, as well as halogen content of the halogenated copolymer. However, the vulcanization parameters can readily be established with a few experiments utilizing e.g., a laboratory characterization device well known in the art, the Monsanto Oscillating Disc Cure Rheometer (ODR, described in detail in American Society for Testing and Materials, Standard ASTM D 2084).

The tire carcass composition of the present invention may be used for the production of carcasses for any type of rubber tires, for example, automobile tires. The tires typically comprise a circumferential rubber tread, a supporting carcass, 2 rubber sidewalls, and 2 spaced beads. The composition of the present invention may be used to produce at least a portion of the carcass.

The tire, including the carcass, may be produced by any conventional method.

The air permeability test used to obtain the results plotted in the FIGURE was the American Instrument Company procedure. The brominated copolymer of isobutylene and para-methylstyrene comprised 1.2 weight percent of bromine and 5 weight percent of the para-methylstyrene units.

The following examples are presented to illustrate the invention.

EXAMPLE

Experiments were performed to compare formulations in accordance with the present invention to formulations comprising other copolymers in a tire carcass type of formulation. Formulations A, B, C, D, E, and F are compositions in accordance with the present invention. Formulation G is a comparative composition which is not in accordance with the present invention.

The polymers and amounts thereof, which were present in the formulations, are shown in Table I.

The other ingredients, which were present in the formulations, are shown in Table II. All values shown in Tables I and II are weight parts.

Polymer T was a brominated copolymer of isobutylene and para-methylstyrene containing 0.85 weight percent bromine and 5 weight percent para-methylstyrene.

Polymer Z was a brominated copolymer of isobutylene and para-methylstyrene containing 1.2 weight percent bromine and 5 weight percent para-methylstyrene.

Polymer W was a blend of natural rubber (NR) and a copolymer of styrene and butadiene (SBR).

Formulations A through G were compounded using a laboratory internal mixer (Banbury). The mix cycle was as follows: the polymers were added; at 30 seconds to 1 minute, carbon black, other filler, and plasticizer were added, etc. At approximately 5 minutes, dump (batch temperature 120 to 160° C.).

Curatives and accelerators were incorporated into the composition on a roll mill.

Vulcanization conditions for formulations A through G included a temperature of 160° C. for 30 minutes in a standard compression molding press at 2000 psi.

The descriptions of the trademark names used in Table II are shown in Table III. The results of the tests are shown in Table IV. The test methods used to measure the properties shown in Table IV are given in Table V.

TABLE I

| | FORMULATION | | | | | | |
|---|---|---|---|---|---|---|---|
| POLYMER | A | B | C | D | E | F | G |
| Polymer T | 45 | 35 | 25 | — | — | — | — |
| Polymer Z | — | — | — | 45 | 35 | 25 | — |
| Polymer W | 10/45 | 20/45 | 30/45 | 10/45 | 20/45 | 30/45 | 40/60 |

TABLE II

| INGREDIENTS | Formulations A to F | Formulation G |
|---|---|---|
| N-660 (GPF carbon black) | 55 | 45 |
| Flexon 391 (Naphthenic Oil) | 7 | 4 |
| Struktol 40MS | 4 | — |
| SP-1068 | 3 | 4 |
| Stearic Acid | 1 | 1 |
| Flectol H | 0.5 | 0.5 |
| ZnO | 3 | 3 |
| Crystex 90 OT-20 | 1 | 1 |
| MBTS | 1.25 | 1 |
| Santocure NS | 0.6 | 1.2 |
| Vultac 5 | 0.5 | — |

TABLE III

| Ingredient | Description and Trademark Owner |
|---|---|
| N660 | Carbon black, ASTM type N660 |
| Flexon 391 oil | Naphthenic Oil, Exxon Company USA |
| Struktol 4OMS | Homogenizer, Struktol |
| SP-1068 | Alkylphenol formaldelyde resin Schenectady Chemicals |
| FLECTOL H | Polymerized 1,2, dihydro-2,2,4-trimethylquinone Hardwick |
| CRYSTEX 90 OT-20 | Polymerized sulfur, added oil Stauffer Chemical |
| MBTS | 2,2'-benzothiazyl disulfide |
| Santocure NS | N-t-butyl-2-benzothiazolesulfenamide Hardwick |
| Vultac 5 | Alkylphenol disulfide on insert carrier, PENNWALT |

TABLE IV

| | FORMULATION | | | | | | |
|---|---|---|---|---|---|---|---|
| | A | B | C | D | E | F | G |
| ML(1 + 4) @ 100° C. | 56 | 54 | 52 | 56 | 55 | 52 | 45 |
| M. Scorch @ 135° C. | 10.2 | 10.6 | 11.1 | 8.7 | 9.1 | 9.1 | 11 |
| Green Strength, kPa | | | | | | | |
| Peak | 317 | 345 | 310 | 324 | 331 | 345 | 214 |
| @ 4 min. | 119 | 121 | 103 | 128 | 130 | 126 | 40 |
| Tc90, min. | 13.5 | 15.3 | 16.5 | 12.8 | 13.7 | 16.3 | 10.9 |

TABLE IV-continued

| | FORMULATION | | | | | | |
|---|---|---|---|---|---|---|---|
| | A | B | C | D | E | F | G |
| 100% Modulus, MPa | | | | | | | |
| Unaged | 1.8 | 1.9 | 1.8 | 1.9 | 1.9 | 1.8 | 1.8 |
| Aged | 3.8 | 4.0 | 3.9 | 3.9 | 4.2 | 4.0 | 4.6 |
| 300% Modulus, MPa | | | | | | | |
| Unaged | 6.6 | 7.2 | 6.9 | 7.1 | 7.2 | 7.1 | 8.0 |
| Aged | — | — | — | — | — | — | — |
| Tensile, MPa | | | | | | | |
| Unaged | 15.1 | 16.0 | 17.0 | 14.1 | 16.2 | 17.3 | 22.0 |
| Aged | 7.9 | 7.4 | 8.0 | 8.4 | 8.0 | 8.3 | 5.7 |
| Retention, % | 37 | 33 | 33 | 45 | 36 | 35 | 20 |
| Elongation, % | | | | | | | |
| Unaged | 610 | 600 | 600 | 560 | 590 | 600 | 580 |
| Aged | 225 | 200 | 200 | 250 | 210 | 210 | 120 |
| Retention, % | 37 | 33 | 33 | 45 | 36 | 35 | 20 |
| Adhesion, kN/m | | | | | | | |
| BSW: | | | | | | | |
| @ RT | 6.9 | 8.6 | 25.6 | 6.5 | 8.6 | 35.3 | 35.3 |
| @ 100° C. | 3.2 | 3.7 | 7.2 | 3.0 | 4.6 | 16.8 | 15.0 |
| Liner: | | | | | | | |
| @ RT | 26.5 | 35.3 | 24.7 | 28.2 | 25.6 | 25.6 | 11.6 |
| @ 100° C. | 19.4 | 20.4 | 18.5 | 18.5 | 20.2 | 19.4 | 9.5 |
| Self, RT | 35.3 | 35.3 | 35.3 | 35.3 | 35.3 | 35.3 | 35.3 |
| H-Adhesion, N/m (Cord adhesion) | 215 | 347 | 333 | 308 | 363 | 274 | 290 |
| Air Permeability, $Q \times 10^{-3}$ | | | | | | | |
| @ RT | 0.9 | 1.1 | 1.4 | 0.9 | 1.1 | 1.4 | 2.7 |
| @ 66° C. | 5.9 | 7.2 | 8.4 | 5.9 | 7.2 | 8.6 | 13.7 |

TABLE V

| Property | Test |
|---|---|
| Mooney Viscosity | ASTM D1646 |
| Mooney Scorch | ASTM D1646 |
| Green Strength | Instron Tester, Die A |
| Tensile retention | ASTM D573 |
| Elongation retention | ASTM D573 |
| Adhesion | ASTM D 413 |
| BSW | ASTM D 413 |
| LINER | ASTM D 413 |
| SELF | ASTM D 413 |
| H-Adhesion | ASTM D 2138 |
| Air Permeability | American Instrument Co., Inc. Procedure |

As can be seen from the data in the Tables, Formulations A, B, C, D, E, and F, which were formulations in accordance with the present invention, exhibited decreased air permeability, improved heat aging resistance and equivalent adhesion compared to comparative Formulation G.

What is claimed is:

1. A vulcanized tire comprising a carcass, at least a portion of said carcass being made of a composition comprising
    (a) a halogen-containing copolymer of a $C_4$ to $C_7$ isomonoolefin and a para-alkylstyrene;
    (b) a rubber selected from the group consisting of natural rubber, styrene butadiene polymer, and mixtures thereof;
    (c) carbon black; and
    (d) a plasticizer oil;
said carcass, when vulcanized having an air permeability of 1.4 or less when measured at room temperature.

2. The vulcanized tire of claim 1, wherein said composition additionally comprises a component selected from the group consisting of a filler other than carbon black, a rubber compounding additive and mixtures thereof.

3. The vulcanized tire of claim 1, wherein said composition comprises from about 5 to about 70 weight percent of said copolymer; from about 30 to about 95 weight percent of said rubber; from about 20 to about 70 weight percent of carbon black; and from about 2 to 20 weight percent of said plasticizer oil, based on the weight of said component (a) plus said component (b).

4. The vulcanized tire of claim 1 wherein said plasticizer oil comprises a naphthenic oil, and wherein said rubber comprises natural rubber.

5. The vulcanized tire of claim 1, wherein said copolymer comprises from about 0.5 to about 20 weight percent of said para-alkylstyrene.

6. The vulcanized tire of claim 1, wherein said copolymer comprises from above zero to about 7.5 weight percent of said halogen.

7. The vulcanized tire of claim 1, wherein said halogen is selected from the group consisting of chlorine, bromine, and mixtures thereof.

8. The vulcanized tire of claim 1, wherein said halogen comprises bromine, and wherein said bromine is chemically bound to said para-alkylstyrene.

9. The vulcanized tire of claim 1, wherein said isomonoolefin is isobutylene and said para-alkylstyrene is para-methylstyrene.

10. The vulcanized tire of claim 2, wherein said component is a filler, and wherein said filler is selected from the group consisting of clay, silica, calcium carbonate, titanium dioxide, and mixtures thereof.

11. The vulcanized tire of claim 2, wherein said component is a rubber compounding additive and wherein said rubber compounding additive is selected from the group consisting of antioxidants, stabilizers, pigments, and mixtures thereof.

12. The vulcanized tire of claim 1, wherein said tire is an automobile tire.

13. A vulcanized tire comprising a carcass, at least a portion of said carcass being made of a composition comprising:

(a) as an elastomer, (1) a halogen-containing copolymer of a $C_4$ to $C_7$ isomonoolefin and a para-alkylstyrene; and
(2) a blend of a natural rubber and a copolymer of styrene and butadiene, (b) carbon black; and (c) a plasticizer oil.

14. The vulcanized tire of claim 13, wherein on a basis of 100 parts weight of elastomer said composition comprises from about 5 to 70 parts weight of said copolymer and 95 to 30 parts weight of said blend.

15. The vulcanized tire of claim 14, wherein said blend of natural rubber (NR) and a copolymer of styrene and butadiene (SBR) is in a NR:SBR weight ratio of from about 1:1 to about 5:1.

16. The vulcanized tire of claim 15, wherein said carbon black comprises from about 20 to 70 parts weight.

17. The vulcanized tire of claim 16, wherein said plasticizer oil comprises from about 2 to 20 parts weight.

18. The vulcanized tire of claim 14, wherein said composition comprises from about 10 to about 50 parts weight of said copolymer and 90 to 50 parts weight of said blend.

19. The vulcanized tire of claim 18, wherein said blend of natural rubber (NR) and a copolymer of styrene and butadiene (SBR) is in a NR:SBR weight ratio of from about 1.5:1 to about 3:1.

20. The vulcanized tire of claim 19, wherein said carbon black comprises from about 40 to 60 parts weight.

21. The vulcanized tire of claim 20, wherein said carbon black has a typical average particle size of 49 to 60 nm.

22. The vulcanized tire of claim 20, wherein said carbon black is a 600 series carbon black in accordance with ASTM nomenclature.

23. The vulcanized tire of claim 22, wherein said carbon black is N-660.

24. The vulcanized tire of claim 23, wherein said composition comprises from about 25 to about 45 parts weight of said copolymer and 75 to 55 parts weight of said blend.

25. The vulcanized tire of claim 18, wherein the composition as vulcanized at 160° C. for 30 minutes in a standard compression molding press at 2,000 psi has an unaged 100% modulus of 1.9 MPa or less and an unaged elongation greater than 500%.

* * * * *